US010450414B2

(12) United States Patent
Martinoni et al.

(10) Patent No.: US 10,450,414 B2
(45) Date of Patent: *Oct. 22, 2019

(54) POWDER COMPOSITIONS AND METHODS OF MANUFACTURING ARTICLES THEREFROM

(71) Applicant: 3D Systems, Inc., Rock Hill, SC (US)

(72) Inventors: Raffaele Martinoni, Wolfhausen (CH); Paul Boehler, Uetikon (CH); Paul Stenson, Gattikon (CH); Jurgen Spindler, Domat (CH); Eberhard Kinkelin, Chur (CH); Gerhard Possnecker, Passug-Araschgen (CH)

(73) Assignee: 3D Systems, Inc., Rock Hill, SC (US)

( * ) Notice: Subject to any disclaimer, the term of this patent is extended or adjusted under 35 U.S.C. 154(b) by 293 days.

This patent is subject to a terminal disclaimer.

(21) Appl. No.: 15/435,835

(22) Filed: Feb. 17, 2017

(65) Prior Publication Data

US 2017/0158816 A1 Jun. 8, 2017

Related U.S. Application Data

(63) Continuation of application No. 12/921,646, filed as application No. PCT/US2009/036993 on Mar. 12, 2009, now Pat. No. 9,611,355.

(60) Provisional application No. 61/036,765, filed on Mar. 14, 2008.

(51) Int. Cl.
| | | |
|---|---|---|
| *C08G 69/16* | (2006.01) | |
| *B33Y 70/00* | (2015.01) | |
| *B33Y 10/00* | (2015.01) | |
| *C08G 69/08* | (2006.01) | |
| *C08G 69/14* | (2006.01) | |
| *C08J 3/12* | (2006.01) | |
| *C08L 77/02* | (2006.01) | |
| *C08K 3/36* | (2006.01) | |
| *B29C 64/153* | (2017.01) | |
| *B29K 77/00* | (2006.01) | |

(52) U.S. Cl.
CPC ............ *C08G 69/16* (2013.01); *B29C 64/153* (2017.08); *B33Y 10/00* (2014.12); *B33Y 70/00* (2014.12); *C08G 69/08* (2013.01); *C08G 69/14* (2013.01); *C08J 3/12* (2013.01); *C08K 3/36* (2013.01); *C08L 77/02* (2013.01); *B29K 2077/00* (2013.01); *C08J 2377/02* (2013.01); *Y10T 428/31728* (2015.04)

(58) Field of Classification Search
CPC ...... C08G 69/26; C08J 2377/02; C08L 77/02; C08L 77/06
See application file for complete search history.

(56) References Cited

U.S. PATENT DOCUMENTS

| | | | |
|---|---|---|---|
| 4,344,056 A | 6/1982 | Meyer et al. | |
| 4,356,300 A | 10/1982 | Isler et al. | |
| 5,283,213 A | 2/1994 | Ohst et al. | |
| 5,648,450 A | 7/1997 | Dickens, Jr. et al. | |
| 5,760,163 A | 6/1998 | Fisch et al. | |
| 5,786,562 A | 7/1998 | Larson | |
| 6,136,948 A | 10/2000 | Dickens, Jr. et al. | |
| 6,245,281 B1 | 6/2001 | Scholten et al. | |
| 6,531,086 B1 | 3/2003 | Larsson | |
| 6,864,354 B2 | 3/2005 | Peduto et al. | |
| 6,872,800 B1 | 3/2005 | Bouquerel et al. | |
| 7,135,525 B2 | 11/2006 | Petter et al. | |
| 7,148,286 B2 | 12/2006 | Baumann et al. | |
| 7,211,615 B2 | 5/2007 | Baumann et al. | |
| 7,261,542 B2 | 8/2007 | Hickerson et al. | |
| 8,647,551 B2 * | 2/2014 | Dowe .................... | C08K 5/098 264/209.1 |
| 9,611,355 B2 * | 4/2017 | Martinoni .............. | C08G 69/08 |
| 2003/0191221 A1 | 10/2003 | Meyers et al. | |
| 2004/0034152 A1 | 2/2004 | Oka et al. | |
| 2004/0102539 A1 * | 5/2004 | Monsheimer .......... | C08G 69/08 522/2 |
| 2004/0137228 A1 | 7/2004 | Monsheimer et al. | |
| 2005/0027050 A1 | 2/2005 | Monsheimer et al. | |
| 2006/0041041 A1 | 2/2006 | Douais et al. | |
| 2006/0071359 A1 | 4/2006 | Monsheimer et al. | |
| 2006/0189784 A1 | 8/2006 | Monsheimer et al. | |
| 2006/0202395 A1 | 9/2006 | Monsheimer et al. | |
| 2006/0244169 A1 | 11/2006 | Monsheimer et al. | |
| 2006/0247363 A1 | 11/2006 | Schwitzer et al. | |
| 2007/0013108 A1 | 1/2007 | Monsheimer et al. | |

(Continued)

FOREIGN PATENT DOCUMENTS

| | | |
|---|---|---|
| EP | 0774480 A1 | 5/1997 |
| EP | 0345648 B2 | 4/2000 |

(Continued)

OTHER PUBLICATIONS

English translation of Korea's Notice of Preliminary Rejection (4 pages).
McGrath, James E. Ring—Opening Polymerization: Introduction. Ring-Opening Polymerization. Aug. 16, 1985, 1-22. DOI: 10.1021/bk-1985-0286.ch001.
International Search Report and Written Opinion dated Apr. 20, 2009, for corresponding International Application No. PCT/US2009/036993 (7 pages).

(Continued)

*Primary Examiner* — Gregory Listvoyb

(57) ABSTRACT

Powder compositions and articles and methods of forming articles from powder compositions are provided. The powder compositions include at least one powder that preferably includes an amount of one or more branched polymers such as, for example, one or more branched polyamide polymers. The powder composition is preferably capable of being formed, via a layer-by-layer sintering process such as, for example, selective laser sintering, into a three-dimensional article.

20 Claims, 2 Drawing Sheets

(56) References Cited

U.S. PATENT DOCUMENTS

| | | |
|---|---|---|
| 2007/0126159 A1 | 6/2007 | Simon et al. |
| 2007/0182070 A1 | 8/2007 | Monsheimer et al. |
| 2007/0183918 A1 | 8/2007 | Monsheimer et al. |
| 2007/0197692 A1 | 8/2007 | Monsheimer et al. |
| 2007/0232753 A1 | 10/2007 | Monsheimer et al. |
| 2008/0166496 A1 | 7/2008 | Monsheimer et al. |

FOREIGN PATENT DOCUMENTS

| | | |
|---|---|---|
| JP | 2004-137465 | 5/2004 |
| WO | 9606881 A2 | 3/1996 |
| WO | 2005090448 A1 | 9/2005 |
| WO | 2005111119 A1 | 11/2005 |

OTHER PUBLICATIONS

Farina, et al., "Synthesis and Characterization of Star-Branded Nylon 12," Macromol. Symp. 2004, 218, 51-60, in 2004 by WILEY-VCH Verlag GmbH 7 KGaA, Weinheim (10 pages).

English language translation of EP0345348B2, translated from German by Scientific Translation Services, 411 Wyntre Drive, Bryn Mawr, PA 19010 (23 pages).

\* cited by examiner

POWDER COMPOSITIONS AND METHODS OF MANUFACTURING ARTICLES THEREFROM

CROSS REFERENCE TO RELATED APPLICATIONS

This application is a Continuation of U.S. patent application Ser. No. 12/921,646 filed on Nov. 9, 2010, which is a National Stage filing under 35 U.S.C. § 371 of International Patent Application No. PCT/US2009/036993 filed on Mar. 12, 2009, which itself claims priority to U.S. Provisional Application Ser. No. 61/036,765 filed on Mar. 14, 2008, entitled "Powder Compositions and Methods of Manufacturing Articles Therefrom," each of which is incorporated herein by reference in its entirety.

TECHNICAL FIELD

This invention relates to powder compositions, methods of making powder compositions, and methods of manufacturing articles from powder compositions.

BACKGROUND

Selective laser sintering ("SLS") is a process whereby a three-dimensional article is constructed in a layer-by-layer process from powdered material. A given cross-section is formed by irradiating selected portions of a powder layer with a laser beam to melt the powder falling within a predetermined boundary of the desired cross-section. Successive layers of powder are applied and irradiated until the desired three-dimensional article has been produced. The non-irradiated powder supports the article as it is produced, allowing for overhangs and undercuts without the use of other supports. A detailed description of SLS technology can be found in U.S. Pat. Nos. 4,247,508, 4,863,538, 5,017,753, and 6,110,411, each incorporated herein by reference.

SLS technology has enabled the direct manufacture of three-dimensional articles of high resolution and dimensional accuracy from a variety of powdered materials including conventional polymer powders. These conventional powders are well suited to rapid prototyping and various other applications. However, articles produced from conventional polymer powders via SLS processes typically exhibit inferior mechanical properties relative to articles produced by more conventional manufacturing processes such as, for example, injection molding.

A further disadvantage typically associated with conventional SLS polymers is the high amount of waste that can result from their use in SLS processes. Given the selectivity of SLS processes, a substantial amount of non-irradiated powder typically remains after the production of SLS articles. Efforts have been made to reuse the non-irradiated powder for production of subsequent SLS articles. Conventional laser-sinterable polyamide powders, however, have a tendency to undergo changes (possibly caused by post-condensation reactions under the elevated temperature conditions prevailing in the forming chamber of the SLS machine), which can cause unsuitable rises in viscosity that (a) limit the further use (i.e., the "recyclability") of the powder in subsequent SLS processes or (b) cause conventional polyamide powders to be mixed with a substantial portion of new powder before being reused. This ultimately results in the accumulation of an excess of powder that is no longer suitable for use in SLS processes.

Thus, there is a continuing need for improved powder compositions for use in producing sintered articles.

SUMMARY

In one aspect, the invention provides a powder composition useful for forming three-dimensional articles using sintering processes such as, for example, selective laser sintering ("SLS") or selective mask sintering ("SMS"). The powder composition preferably includes one or more branched polymers, preferably in an amount of at least about 5 weight percent ("wt-%").

In another aspect, the invention provides a powder composition that has a laser-sinterable powder that includes a polyamide polymer component, preferably in an amount that constitutes at least about 20 wt-% of the laser-sinterable powder. The polyamide polymer component preferably includes one or more branched polyamide polymers that, in a preferred embodiment, are present in an amount that constitutes at least about 5 wt-% of the laser-sinterable powder. In a presently preferred embodiment, the branched polyamide polymer is a reaction product of reactants including a polycarboxylic acid having 3 or more carboxylic groups (or precursors or derivatives thereof).

In yet another aspect, the invention provides a method for forming a sinterable powder, preferably a laser-sinterable powder. The method preferably includes providing a polyamide polymer component that is a reaction product of: (i) a compound having at least 3 carboxylic, amine, or amide groups and (ii) a cyclic amide, amino acid, and/or combination thereof. The polyamide polymer component preferably includes one or more branched polyamide polymers. The method further includes forming a sinterable powder such as, for example, an SLS powder that includes the polyamide polymer component. The polyamide polymer component preferably constitutes at least about 20 wt-% of the sinterable powder and preferably includes an amount of the one or more branched polyamide polymers that constitutes at least about 5 wt-% of the sinterable polymer.

In yet another aspect, the invention provides a method for sintering powder compositions described herein in a layer-by-layer selective sintering process to form a three-dimensional article. In one embodiment, a layer of a powder composition is provided that includes one or more branched polymers in an amount of at least about 5 wt-%. In a preferred embodiment, the powder composition comprises at least about 20 wt-% polyamide polymer. At least a portion of the powder layer is then selectively melted. A three-dimension article is formed by applying one or more additional layers to a preceding layer.

In yet another aspect, the invention provides a three-dimensional article including a plurality of sintered layers formed from a suitable sinterable powder composition described herein. The sintered layers preferably include a polymer matrix having one or more branched polymers that constitute at least about 5 wt-% of the polymer matrix.

The above summary of the invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

Selected Definitions

Unless otherwise specified, the following terms as used herein have the meanings provided below.

As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. Thus, for example, the term "alkyl group" encompasses the term "alkyl moiety." The disclosure of a particular group is also intended to be an explicit disclosure of the corresponding moiety of that particular group.

A group that may be the same or different is referred to as being "independently" something.

Unless otherwise indicated, the term "polymer" includes both homopolymers and copolymers (i.e., polymers of two or more different monomers).

The terms "comprises" and "includes" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Disclosure of a range includes disclosure of all subranges included within the broader range (e.g., 1 to 5 discloses 1 to 4, 1.5 to 4.5, 1 to 2, etc.).

The term "sinterable powder" refers to a powder that is capable of being selectively sintered in a layer-by-layer process to form a three-dimensional article consisting of adherent layers.

The term "laser-sinterable powder" refers to a powder that is capable of being sintered in a SLS machine to form a three-dimensional article. A laser-sinterable powder is preferably capable of (i) being applied to a build surface of a SLS machine, (ii) being melted by a laser beam of the SLS machine to form a first layer (either in the presence or absence of one or more additional materials), and (iii) forming a second overlying layer adhered to the first layer.

Unless indicated otherwise, the terms "test specimen" and "SLS test specimen" refer to bars produced by suitable SLS processes and having the preferred dimensions of Type 1A multi-purpose dog-bones specified in International Standard Organization (ISO) 3167 (i.e., multi-purpose dog-bones with center sections that are 80×10×4 millimeters (length× width×thickness)). The sintered layers of the test specimens are oriented in the flatwise planar direction relative to the flatwise face of the test specimens (i.e., parallel to a plane defined by the width and length of the test specimen).

The term "branching unit" refers to a structural unit that has a valence of three or more and is covalently attached to three or more branch units.

The term "branch unit" refers to a mono- or di-valent oligomer or polymer segment that is attached on at least one end to a branching unit.

The term "branched polymer" refers to a polymer that includes one or more branching units and three or more branch units.

The term "melting point" or "melting temperature" refers to the peak value of a melting point curve determined using differential scanning calorimetry pursuant to the test procedures of ISO 11357-3.

The term "recrystallization temperature" refers to the peak value of a recrystallization curve determined using differential scanning calorimetry pursuant to the test procedures of ISO 11357-3.

The term "polycarboxylic acid" includes polycarboxylic acids and derivatives or precursors thereof such as anhydrides or esters. Similarly, the term "carboxylic group" includes carboxylic groups and precursors or derivatives thereof such as anhydride groups or ester groups. Thus, for example, a polycarboxylic acid having two carboxylic groups could have either two carboxylic groups, two ester groups, one ester group and one carboxylic group, or one anhydride group.

DETAILED DESCRIPTION

Figure 1:
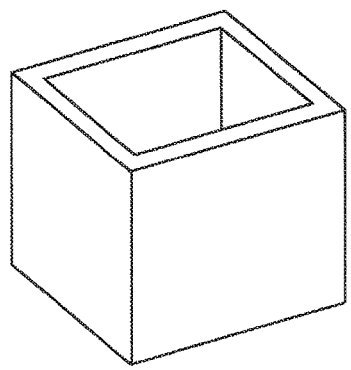
FIG. 1 is a representation of the tower SLS articles produced in the Recycling test of the Test Methods.

In one aspect, the invention provides a powder composition useful for forming three-dimensional articles through sintering processes such as, for example, selective laser sintering ("SLS") or selective mask sintering ("SMS"). In preferred embodiments, the powder composition is a sinterable powder, more preferably a laser-sinterable powder, which includes a suitable amount of one or more branched polymers. The sinterable powder preferably includes at least about 5% by weight of one or more branched polymers, and more preferably at least about 5% by weight of one or more branched polyamide polymers.

Preferred powders of the invention are laser-sinterable powders. Powder compositions that are laser-sinterable typically exhibit a suitable balance of properties such as, for example, suitable particle sizes and/or particle size distributions, heat transfer properties, melt viscosity, bulk density, flow properties (e.g., in the bed of a laser-sintering machine), melting temperature, and recrystallization temperature. A further discussion of these and other properties that laser-sinterable powder compositions typically exhibit is provided below. Although the term "laser-sinterable" is used throughout the below discussion, the majority of the properties may also be desirable for powders suited for other sintering processes such as, for example, SMS processes. Preferred powder compositions of the invention exhibit one or more of the following properties (e.g., acceptable melting temperature, good flow, capable of forming sintered articles of acceptable aesthetic and mechanical quality, and do not exhibit unsuitable processing characteristics in sintering processes), and optimally all of these properties.

For a powder composition to be useful in SLS processes, it is preferably processable within the process parameters of an SLS machine. In current commercially available SLS machines, these process parameters include, for example, the maximum melt temperature of the machine (current SLS machines are typically capable of sintering materials having a melting temperature of about 230° C. or less) and the transport mechanism used by the machine to deposit a thin layer of powder onto a target sintering area (a roller is often used to transport a powder layer from a feed bed onto a part-forming bed). Thus, for example, to be useful in current SLS machines, a powder composition preferably includes a polymer having a melting temperature of less than about 230° C. (more preferably less than about 220° C., even more preferably less than about 210° C.) and is preferably sufficiently flowable in powder form (e.g., from a feed bed onto a part-forming bed) to form a thin even powder layer.

Laser-sinterable powder compositions preferably include one or more semi-crystalline or substantially crystalline polymers.

For a powder to be considered laser-sinterable, it is typically also capable of forming a sintered article that possesses at least a minimal amount of mechanical and aesthetic properties. For example, the sintered article should be capable of being handled under normal circumstances without being damaged. In addition, a laser-sinterable powder composition is preferably capable of forming an SLS article having a surface with sufficient resolution that is preferably substantially smooth and preferably exhibits no more than minimal orange peel. The term "orange peel" is generally used to refer to the presence of surface defects on an SLS article such as unsuitable roughness, or pitting or distortion problems, which negatively affect the appearance or function of the article.

Moreover, for a powder to be suitable for use in sintering applications such as SLS, the powder preferably does not exhibit unsuitable processing characteristics such as, for example, curl or fuming. As used herein, the term "curl" refers to the distortion of an SLS article resulting from phase changes during the sintering process, which can cause curling of one or more portions of a sintered layer (typically out of a horizontal plane) during part production. The term "fuming" refers to the emission of volatiles during part formation, which may condense, for example, on a surface of the sintering machine or a powder bed therein.

The powder composition of the invention preferably includes one or more laser-sinterable powders. The laser-sinterable powder may include any suitable polymer or combination of polymers in any suitable amount. When the powder includes two or more different polymer materials, the different polymer materials may be incorporated into the powder composition either (i) as separate particles and/or (ii) within particles that include a mixture of the different polymer materials. Similarly, the laser-sinterable powder may include one or more additional materials (e.g., fillers or other additives) either (i) as separate components blended with or absorbed onto the polymer particles and/or (ii) as intimate mixtures within the polymer particles.

The laser-sinterable powder preferably includes one or more branched polymers, and more preferably one or more branched polyamide polymers. While not intending to be bound by any theory, the presence of a suitable amount of one or more branched polymers is believed to contribute to the excellent laser-sintering performance of preferred powder compositions of the invention.

The branched polymer may have different structural configurations depending on the intended application, including, for example, the desired properties of the final sintered product (e.g., the level of flexibility, strength, resolution, color, etc.), the other materials with which the polymer composition will be mixed or come into contact, the type of polymer desired, cost considerations, or the process or machinery that will be used to form a sintered article therefrom. When suitably processed in an SLS machine, powders of the invention containing one or more branched polymers are preferably capable of forming an SLS article having a polymeric matrix formed from the branched polymers or the branched polymers and one or more optional other polymers.

Examples of suitable branched polymers include those having branch units selected from polyamides, polyesters, polyolefins (e.g., polyethylene and polypropylene), polyetherketones, polyurethanes, polyvinyl acetates, polymethacrylates, phenolics, ionomers, polyacetals, acrylonitrile-butadiene-styrene copolymers, polyimides, polycarbonates, or combinations thereof. Branched polyamide polymers are preferred branched polymers.

The branched polyamide polymers preferably include a plurality of polyamide branch units. Examples of suitable polyamide branch units include polyamides prepared from reactants including lactams or amino acids, preferably C4-C20 lactams or C2-C20 amino acids. Nylon 11, nylon 12, and copolymers and derivatives thereof are examples of presently preferred branch units. Examples of nylon 11 branch units include nylon oligomer, homopolymer or copolymer segments formed from reactants including a C11 lactam, a C11 amino acid, or a combination thereof. Examples of nylon 12 branch units include nylon oligomer, homopolymer or copolymer segments formed from reactants including a C12 lactam, a C12 amino acid, or a combination thereof. Suitable polyamide branch units further include polyamides formed from reactants including any of the above and diacid co-monomers (preferably C2-C36 diacids), diamine co-monomers (preferably C2-C36 diamines), or combinations thereof. These co-monomers may be of aliphatic, cycloaliphatic, or aromatic nature.

The branched polymers may include any suitable degree of branching. At a minimum, however, the branched polymers preferably include at least one branching unit (and more preferably a single branching unit per branched polymer). If desired, however, the branched polymers may include more than one branching unit such as, for example, 2 or more branching units, 3 or more branching units, 4 or more branching units, 5 or more branching units, etc. In some embodiments, the powder composition includes a branched polymer having a single branching unit and at least 3 (e.g., 3, 4, 5, etc.) oligomer or polymer arms covalently attached to the branching unit. Such branched polymers are often referred to as "star" polymers. In a presently preferred embodiment, the branched polymer includes a single branching unit with 3 or more oligomer or polymer polyamide arms covalently attached to the branching unit (preferably via amide linkages). In some embodiments, the powder composition may include 2 or more branched polymers having different degrees of branching and/or similar or different branch units.

While not intending to be bound by any theory, it is believed that the presence of a single branching unit contributes to the excellent recyclability exhibited by certain preferred powder embodiments of the invention in SLS processes.

Highly branched polymers such as, for example, hyperbranched polymers or dendrimers may be used if desired. Such highly branched polymers may possess one or more features that may be desired for certain applications. For example, such highly branched polymer materials may allow for a higher molecular weight to be achieved (relative to linear polymer analogs) without suitably raising the melt viscosity. In addition, such highly branched polymers may also exhibit a larger number of end groups per polymer molecule as compared to linear polymer analogs.

Branched polymers of the invention may include any suitable end groups in any suitable combination. Examples of preferred end groups include carboxylic groups (including anhydride groups or ester groups), amine groups (preferably primary amine groups), amide groups, alkyl or aryl groups, and combinations thereof.

In preferred embodiments, all of the end groups of the branched polymer are substantially non-reactive with each other and/or substantially the same (e.g., the end groups are substantially all amine groups or substantially all carboxylic groups). In a presently preferred embodiment, the branched polymer is a branched polyamide polymer having carboxylic end groups and few or essentially no amine end groups.

Branched polymers of the invention may have any suitable molecular weight. Non-limiting examples of suitable molecular weights include number average molecular weights ($M_n$) of at least about 8,000, more preferably at least about 12,000, and even more preferably at least about 16,000. Such branched polymers preferably have a $M_n$ of less than about 60,000, more preferably less than about 40,000, and even more preferably less than about 32,000.

Any suitable materials and any suitable process may be used to produce branched polymers of the invention. To achieve branching, the branched polymers will typically be produced from reactants that include one or more tri-functional or higher (e.g., tetra-functional, penta-functional, hexa-functional, etc.) compounds having three or more reactive functional groups. Although the number of reactive functional groups in such branching compounds is not restricted, tri-functional and tetra-functional compounds are preferred. Preferred reactive functional groups include carboxylic (including anhydride or ester groups), amine, or amide groups. The functional groups of the branching compounds are preferably of the same type (e.g., substantially all carboxylic, substantially all amine, or substantially all amide), although any suitable combination of functional groups may be used. Polyamines, polyamides, and polycarboxylic acids are preferred branching compounds, with polycarboxylic acids being presently preferred.

In preferred embodiments, the branched polyamide is a reaction product of an AB compound and a $B_n$ compound, where n is 3 or more, more preferably from 3 to 10, even more preferably 3 or 4, and optimally 3; and A and B are independently selected from carboxylic groups (including anhydride or ester groups), amine groups, or amide groups, with A and B being complimentary functional groups capable of reacting with one another. In presently preferred embodiments, A denotes an amine group and B denotes a carboxylic group. For purposes of this invention, an anhydride group shall be considered as comprising two carboxylic groups.

The stoichiometry of the AB and $B_n$ compounds may be varied to achieve a branched polymer of a desired viscosity and/or molecular weight. In certain preferred embodiments, the stoichiometry ranges from about 0.0001:1 to about 0.03:1 (mole equivalents $B_n$ to mole equivalents AB), more preferably from about 0.001:1 to about 0.02:1 (mole equivalents $B_n$ to mole equivalents AB), and even more preferably from about 0.002:1 to about 0.013:1 (mole equivalents $B_n$ to mole equivalents AB).

Examples of suitable $B_n$ compounds include branching compounds having 3 or more reactive functional groups, e.g., carboxylic groups (including ester or anhydride groups as previously discussed), amine groups, or amide groups. Polycarboxylic acids having 3 or more carboxylic groups are presently preferred. Examples of suitable polycarboxylic acids include benzene-pentacarboxylic acid; mellitic acid; 1,3,5,7 napthaline-tetracarboxylic acid; 2,4,6 pyridine-tricarboxylic acid; pyromellitic acid; trimellitic acid; trimesic acid; 3,5,3',5'-biphenyltetracarboxylic acid; 3,5,3',5'-bipyridyltetracarboxylic acid; 3,5,3',5'-benzophenonetetracarboxylic acid; 1,3,6,8-acridinetetracarboxylic acid; 1,2,4,5-benzenetetracarboxylic acid; anhydrides or esters thereof, or mixtures thereof. Aromatic polycarboxylic acids are presently preferred. While not intending to be bound by any theory, aromatic polycarboxylic acids are believed to exhibit enhanced reactivity. Trimesic acid is a preferred polycarboxylic acid.

Examples of suitable polyamines include diethylenetriamine, triethylenetetramine, tris-(2-aminoethyl)amine, bis(hexamethylene)triamine, bis(6-aminohexyl)amine, 1,2,3-triaminopropane, 1,2,3,4-Tetraaminobutane, melamine, poly(propyleneoxide)amines based on timethylolpropane or glycerin (e.g.; Jeffamine T series), tallow triamines and mixtures and derivates thereof.

Examples of suitable AB compounds include cyclic amides, amino acids, and combinations thereof. Although cyclic amides are not linear AB compounds, these compounds are referred to herein as AB compounds because the compounds can typically ring open under suitable conditions to yield an AB compound. Such ring-opening reactions are frequently employed in the production of nylons from lactams.

Examples of suitable cyclic amides include lactams, and more preferably C8-C20 lactams. Specific examples of some C8-C20 lactams include capryllactam (a C8 lactam) and laurolactam (a C12 lactam commonly referred to as "lauryllactam"). Although not presently preferred, one or more non-C8-C20 lactams (i.e., C7 or less lactams and C21 or greater lactams) may be employed such as, for example, 4-aminobutanoic acid or γ-butyrolactam; 5-aminopentanoic acid or δ-amylolactam; or ε-caprolactam.

Suitable amino acids may be employed as an AB compound, including, for example, ring-opened forms of any of the above lactams and/or naturally occurring amino acids such as, for example, glycine. Preferred amino acids contain more than 6 carbon atoms, with aminoundecanoic acid being particularly preferred.

Presently preferred AB compounds include aminoundecanoic acid, laurolactam, and mixtures thereof.

In certain preferred embodiments, the branched polyamide polymer may include (i) nylon 11 branch units (including copolymer or derivative units such as, e.g., nylon 6,11), (ii) nylon 12 branch (including copolymer or derivative units such as, e.g., nylon 11,12), or (iii) a combination thereof. In some embodiments, a branched polyamide polymer that includes both nylon 11 and nylon 12 branch units may be produced, for example, using a mixture of laurolactam and aminoundecanoic acid in combination with one or more branching compounds. In one such embodiment, about 9 parts of laurolactam are included per about 1 part of aminoundecanoic acid.

The reactant mixture used to form the branched polyamide may also include one or more additional reactants such as, for example, mono- or di-amines, mono- or di-carboxylic acids, or combinations thereof.

In a preferred embodiment, the branched polyamide polymer is a reaction product of (i) a first compound that is a tri-functional or higher carboxylic acid having 3 or more carboxylic groups and (ii) a second compound that is a lactam, amino acid, or combination thereof (preferably a C8-C20 lactam). In such embodiments, the reaction mixture may include a combination of one or more tri-functional or higher carboxylic acids and one or more mono- or di-functional carboxylic acids. Such mixtures preferably include at least about 40 wt-% of the one or more tri-functional or higher carboxylic acids, more preferably at least about 65 wt-% of the one or more tri-functional or higher carboxylic acids, even more preferably at least about 95 wt-% of the one or more tri-functional or higher carboxylic acids, based on the total combined weight of the one or more tri-functional or higher carboxylic acids and the mono- or di-functional carboxylic acids.

In a presently preferred embodiment, the branched polyamide polymer is a reaction product of reactants including trimesic acid, and more preferably both trimesic acid and laurolactam or aminoundecanoic acid. In a particularly preferred embodiment, the branched polyamide polymer is a reaction product of a reaction mixture containing from about 0.5 wt-% to about 1.2 wt-% of trimesic acid, more preferably from about 0.65 wt-% to about 1.1 wt-% of trimesic acid, and even more preferably from about 0.85 wt-% to about 1 wt-% of trimesic acid, based on the total weight of the reaction mixture.

When a lactam is included, the reaction mixture preferably includes a suitable amount of water to efficiently facilitate hydrolytic polymerization of the branched polyamide polymer. In preferred embodiments, the reaction mixture includes at least about 2 wt-% of water, and more preferably from about 2 wt-% to about 6 wt-% of water.

While not presently preferred, other polymerization approaches may be employed that include as reactants an $A_2$ compound and a $B_n$ compound, where A, B, and n are as described above. In such polymerization approaches, suitable steps should preferably be taken to avoid premature gelation.

If desired, the branched polymers and any optional other polymer may be end-capped with one or more suitable end-capping compounds. The end-capping compounds may, for example, be added to a reaction mixture used to form the branched polymer or, alternatively, may be post-reacted with a preformed branched polymer. Any suitable compound that reacts with the end groups of the branched polymer may be used. For example, for carboxylic end groups, amine compounds (e.g., mono-amine compounds) such as aminohexane, aminododecane, tridecylamine, octadecanamine, 2-ethyl-1-hexanamine, 2-methoxyethylamin, 3-(2-ethylhexoxy)-1-propanamine, cyclohexanamine, benzenemethanamine, 2-benzeneethanamine, t-butylamine, aniline, or mixtures thereof, may be employed.

One or more optional stabilizers may be employed in forming branched polyamides of the invention. Any suitable amount of one or more stabilizers may be used. In certain preferred embodiments, the reaction mixture used to form the branched polyamide polymer preferably includes from about 0 to about 0.5 wt-% of one or more stabilizers. Examples of some suitable stabilizers may include antioxidants such as, for example, phenolic antioxidants, aromatic hindered amine stabilizers or aliphatic hindered amine stabilizers; process stabilizers such as, for example, phosphonite-based or organo-phosphate-based process stabilizers; or mixtures thereof.

In certain embodiments, the reaction mixture for forming the branched polyamide polymer preferably includes a mixture of a phosphonite-based process stabilizer and a phenolic antioxidant, which are preferably present in a stoichiometric ratio of about 1:4 to about 2:1 (phenolic antioxidant to phosphonite-based process stabilizer), and more preferably from about 1:2 to about 3:4 (phenolic antioxidant to phosphonite-based process stabilizer).

The reactants for forming the branched polymer may be blended together all at once or may be added to a reactor in any suitable order.

In preferred embodiments, the powder composition of the invention includes a suitable amount of a polyamide polymer component. The polyamide polymer component preferably constitutes at least about 20 wt-%, more preferably at least about 50 wt-%, and even more preferably at least about 60 wt-% of the powder composition. The polyamide polymer component preferably includes a suitable amount of one or more branched polyamide polymers. In preferred embodiments, the polyamide polymer component includes at least about 25 wt-%, more preferably at least about 40 wt-%, and even more preferably at least about 50 wt-% of one or more branched polyamide polymers. Preferably, the overall powder composition includes at least about 5 wt-%, more preferably at least about 10 wt-%, even more preferably at least about 20 wt-%, even more preferably at least about 30 wt-%, and optimally at least about 40 wt-% of one or more branched polyamide polymers. While not intending to be bound by any theory, the presence of one or more branched polyamide polymers in a suitable amount is believed to contribute to the excellent laser-sintering properties of preferred powder compositions of the invention by, for example, improving flow and improving mechanical strength of sintered parts.

It is contemplated that the amount of polyamide component and/or branched polyamide polymer in certain embodiments may fall outside the above weight ranges. This may occur, for example, if filler having a particularly high density is included in the powder composition.

In some embodiments, it is contemplated that non-polyamide branched polymers (e.g., branched polyester polymers, etc.) may be used in amounts similar to those described above for the branched polyamide polymers.

The polyamide polymer component may also include one or more linear (i.e., non-branched) polyamide polymers. In such embodiments, the linear polyamide polymers may be added as preformed polymers or may be formed in situ during polymerization of the branched polyamide polymer.

The polyamide polymer component preferably includes either (i) an excess of carboxylic end groups relative to amine end groups or (ii) an excess of amine groups relative to carboxylic groups, and more preferably an excess of carboxylic end groups relative to amine end groups. In certain preferred embodiments, the polyamide polymer component preferably includes at least about 3 carboxylic end groups per amine end group, even more preferably from about 3 to about 20 carboxylic end groups per amine end group, and optimally from about 6 to about 20 carboxylic end groups per amine end group. In other embodiments, the polyamide polymer component includes at least about 3 amine end groups per carboxylic end group, more preferably from about 3 to about 20 amine end groups per carboxylic end group, and optimally from about 6 to about 20 amine end groups per carboxylic end group. If desired (e.g., if recyclability is not a concern), the polyamide powder component may include an end-group ratio other than those specified above.

The polyamide polymer component of the invention preferably has a melt flow index of at least about 10, more preferably at least about 20, and even more preferably at least about 35 grams per 10 minutes (g/10 min) at 190° C. using a 5 kilogram (kg) weight, when tested using the method described below in the Test Methods. Preferably, the polyamide polymer component has a melt flow index of less than about 100, more preferably less than about 70, and even more preferably less than about 55 g/10 min at 190° C. using a 5 kg weight, when tested using the method described below in the Test Methods. It was a surprising and unexpected result that certain ground powders of the invention that exhibited a melt enthalpy substantially below 100 J/g (e.g., about 60 J/g to 70 J/g) exhibited excellent laser-sintering properties.

Similarly, it was a surprising and unexpected result that certain ground powders of the invention that exhibited a sintering window (i.e., the difference between the melting point and the recrystallization point) of less than about 40° C. (e.g., about 25° C. to about 35° C.) exhibited excellent laser-sintering properties.

The powder composition of the invention may exhibit any suitable particle-size distribution. Preferably, the particle-size distribution is suitable for production of SLS articles with suitable mechanical and aesthetic properties. In preferred embodiments, the volume-average particle diameter of the powder composition is less than about 150 microns, more preferably less than about 100 microns, and even more preferably less than about 70 microns. Preferably, the volume-average particle diameter of the powder composition is greater than about 5 microns, more preferably greater than about 10 microns, and even more preferably greater than about 30 microns.

To facilitate efficient sintering, the powder composition of the invention preferably has a bulk density of at least about 0.3 grams per cubic centimeter (g/cc), more preferably at least about 0.35 g/cc, and even more preferably at least about 0.4 g/cc.

Preferred polyamide powders of the invention exhibit excellent recycling properties. Preferred recycled laser-sinterable polyamide powders of the invention are capable of forming SLS articles (e.g., SLS test specimens) that do not exhibit either (a) orange peel or (b) a significant reduction in mechanical performance (e.g., a reduction of 10% or more in elongation at break, tensile strength at break, etc.) relative to SLS articles formed from fresh powder. Preferred recycled powders of the invention are capable of forming an American Society for Testing and Materials (ASTM) D638 I, Type I dog-bones that do not exhibit either of the above (a) or (b) after the recycled powder has been subjected to at least 1, more preferably at least 5, even more preferably at least 7, and most preferably at least 10 runs in an SLS machine (e.g., a VANGUARD HS HiQ selective-laser-sintering system), when tested pursuant to the recycling procedure of the below Test Methods.

Powder compositions of the invention may be formed using any suitable process and materials. For example, polymer powder suitable for use in selective sintering processes such as SLS or SMS may be produced by precipitating one or more polymer materials described herein from a solution or dispersion containing the polymer materials. Sinterable powder compositions may also be obtained from the materials described herein via milling processes such as, for example, cryogenic grinding.

Preferred polymer powders of the invention are obtained by grinding, preferably at low temperatures (e.g., below about 0° C. and more preferably below about −25° C.). Suitable grinding equipment may include, for example, pinned-disk mills, fluidized-bed opposed-jet mills, and baffle-plate impact mills.

Conventional laser-sinterable polyamide polymers are typically produced using precipitation methods such as, for example, those described in US2004/0102539. It was a surprising and unexpected result that preferred polyamide powders of the invention formed via cryogenic grinding exhibited excellent performance in SLS applications and were capable of forming SLS articles of excellent aesthetic and mechanical quality. While not intending to be bound by any theory, it is believed that the excellent laser-sintering performance of ground powders of the invention is attributable to the inclusion of a suitable amount of branched polyamide polymer.

Powder compositions of the invention may also contain one or more other optional ingredients. Preferably, the optional ingredients either improve or at least do not adversely affect the powder compositions or sintered articles formed therefrom. Such optional ingredients may be included, for example, to enhance aesthetics; to facilitate manufacturing, processing, and/or handling of powder compositions or articles formed therefrom; and/or to further improve a particular property of the powder compositions or articles formed therefrom. Each optional ingredient is preferably included in a sufficient amount to serve its intended purpose, but not in such an amount to adversely affect a powder composition or an article resulting therefrom.

Each individual optional ingredient, if present at all, typically is present in the powder composition in an amount of about 0.1 wt-% to about 80 wt-%. The total amount of optional ingredients in the powder composition preferably ranges from about 0.1 wt-% to about 80 wt-%, and more preferably from 0.1 wt-% to about 50 wt-%. It is not necessary for an optional ingredient to melt during a sintering process. Preferably each optional ingredient is suitably compatible with the one or more polymers of the composition to provide a strong and durable sintered article.

In preferred embodiments, the powder composition of the invention contains an optional flow agent. The flow agent preferably is present in an amount sufficient to allow the powder composition to freely flow and level on the build surface of a SLS machine. When present, the powder composition preferably contains about 0.01 wt-% to about 5 wt-%, more preferably about 0.05 wt-% to about 2 wt-%, and even more preferably about 0.1 wt-% to about 1 wt-% of one or more flow agents, based on the total weight of the powder composition. The optional flow agent is preferably a particulate inorganic material having a volume-average diameter of less than about 10 microns. Examples of suitable flow agents include hydrated silica, amorphous alumina, glassy silica, glassy phosphate, glassy borate, glassy oxide, titania, talc, mica, a fumed silica, kaolin, attapulgite, calcium silicate, alumina, magnesium silicate, and mixtures thereof. Fumed silica is a preferred flow agent.

In some embodiments, the powder composition may include metal fillers such as, for example, aluminum powder, copper powder, tin powder, bronze powder, and mixtures thereof.

In some embodiments, the powder composition may include one or more reinforcing materials. Examples of reinforcing materials include inorganic particles such as boron particles, ceramic particles, glass particles (e.g., glass fibers), and mineral particles (e.g., wollastonite particles); organic particles such as carbon particles (e.g., carbon-fiber particles or carbon nanotubes) and polymeric particles (e.g., polyester particles, polyamide particles—including aramid particles such as KEVLAR fibers and polyvinyl alcohol particles); particles containing both organic and inorganic constituents; and mixtures thereof. For further discussion of suitable reinforcing particles, see, for example, PCT/US2007/082953.

Thermosetting resins may be included in powder compositions of the invention. Thermosetting resins typically provide a less flexible article in a sintering process. Examples of suitable thermosetting resins may include epoxies, acrylates, vinyl ethers, unsaturated polyesters, bismaleimides, and copolymers and mixtures thereof. In some embodiments, thermoplastic resins, thermosetting resins, or a mixture of one or more thermoplastic resins and one or more thermosetting resins may be included in powder compositions of the invention.

Additional optional ingredients include, for example, toners, extenders, fillers, colorants (e.g., pigments and dyes), lubricants, anticorrosion agents, antimicrobial agents, thixotropic agents, dispersing agents, antioxidants, adhesion promoters, light stabilizers, organic solvents, surfactants, flame retardants, conductive materials, crosslinking agents, fluorescent whitening agents, nucleating agents, and mixtures thereof.

Preferably, each ingredient of the powder composition of the invention is suitably dry (e.g., contains a minimal amount of moisture, preferably 2 wt-% or less). Composition ingredients may be milled, ground, or otherwise processed, if necessary, to provide a desired particle size or range of particle sizes.

The optional ingredients described above may be incorporated into the compositions of the invention via any suitable process including, for example, dry blending and/or melt blending.

In some embodiments, the ingredients may be blended together all at once or in any order. The optional ingredients preferably have a particle size no larger than about the range of the particle sizes of the polymer powder included in the blend. The ingredients are preferably blended until a suitable powder composition has been formed. The ingredients may be blended using mechanical mixing, pneumatic mixing (e.g., by fluidized bed or blowing air into silos that contain the various components), or any other suitable mixing technique. After blending, the resulting powder composition may be sieved to provide a powder having a desired particle size and particle size distribution.

In certain embodiments, it may be beneficial to incorporate one or more additives or fillers into polymer materials of the invention via a process including a melt blending step. Using such a process, powder particles may be formed (e.g., via cryogenic grinding of extruded pellets or particles formed from the melt blend) that have the one or more additives or filler embedded within the polymer particles. While not intending to be bound by any theory, such powder compositions of the invention may exhibit one or more improved properties relative to conventional powder blends where the additional materials are incorporated via dry blending with polymer powder. For example, certain filler particles tend to settle out of conventional dry powder blends, which can result in a non-homogenous distribution of the filler particles in a sintered article formed therefrom. When the filler is embedded within polymer particles, the filler is unable to settle out prior to article formation, thereby resulting in a sintered article having a more homogenous distribution of the filler throughout. Such homogeneity may be especially desirable, for example, for certain articles incorporating flame retardants, reinforcing particles, colorants, conductive materials, or electromagnetic materials where a high level of homogeneity is desired.

With regards to reinforcing particles, polymer particles that include the reinforcing particles imbedded within the polymer particles may allow for an enhanced proportion of the reinforcing particles to be oriented in the Z-direction relative to conventional dry blends, thereby enhancing certain mechanical properties of resulting sintered articles. The term "Z-direction" refers to a direction perpendicular to a powder layer or sintered layer resulting therefrom.

In one embodiment, one or more polymer materials described herein is combined with one or more filler or additives (which can be liquids and/or solids) and melt blended to obtain a molten polymer mixture having the one or more additives or fillers homogenously dispersed throughout. The molten polymer mixture is solidified (e.g., by pelletizing into small pellets), and then ground to form a laser-sinterable powder composition of the invention. If desired, the resulting powder may optionally be dry blended with one or more additional particulate and/or powder materials.

In another embodiment, an unfilled or substantially unfilled molten polymer composition of the invention is solidified (e.g., into pellets, particles, fragments sheets, etc.). The solidified polymer material is then ground to form a laser-sinterable powder composition. If desired, the resulting powder may optionally be dry blended with one or more additional particulate and/or powder materials.

Another aspect of the invention is an article produced from a powder composition of the invention using a layer-by-layer sintering process in which regions of a powder layer are selectively melted. A fresh powder layer is applied to the preceding layer and selectively melted. The process is continued until a desired three-dimensional article has been produced. Melting of the powder composition is typically accomplished via application of electromagnetic radiation, with the selectivity of the melting achieved, for example, through selective application of inhibitors, absorbers, susceptors, or the electromagnetic radiation (e.g., through use of masks or directed laser beams). Any suitable source of electromagnetic radiation may be used, including, for example, infrared radiation sources, microwave generators, lasers, radiative heaters, lamps, or a combination thereof.

In some embodiments, selective mask sintering ("SMS") techniques may be used to produce three-dimensional articles of the invention. For further discussion of SMS processes, see for example U.S. Pat. No. 6,531,086 which describes an SMS machine in which a shielding mask is used to selectively block infrared radiation, resulting in the selective irradiation of a portion of a powder layer. If using an SMS process to produce articles from powder compositions of the invention, it may be desirable to include one or more materials in the powder composition that enhance the infrared absorption properties of the powder composition. For example, the powder composition may include one or more heat absorbers and/or dark-colored materials (e.g., carbon black, carbon nanotubes, or carbon fibers).

The powder composition may also be useful in printing processes to form three-dimensional articles. For further discussion of such techniques, see for example U.S. Pat. No. 7,261,542.

SLS is a presently preferred method for producing three-dimensional articles from powder compositions of the invention. SLS articles of the invention preferably include a plurality of overlying and adherent sintered layers that include a polymeric matrix. The sintered layers of the SLS articles may be of any thickness suitable for SLS processing. The plurality of sintered layers are each, on average, preferably at least about 50 microns thick, more preferably at least about 80 microns thick, and even more preferably at least about 100 microns thick. In a preferred embodiment, the plurality of sintered layers are each, on average, preferably less than about 200 microns thick, more preferably less than about 150 microns thick, and even more preferably less than about 120 microns thick.

Powder compositions of the invention may be used to form a variety of articles for use in a variety of applications including, for example, rapid prototyping and rapid manufacturing. Some examples of rapid manufacturing applications include small production run products (e.g., where production by means of an injection mold is not economical or technically feasible) such as, for example, parts for high-specification cars of which only small numbers are produced, replacement parts for motorsports or aerospace industries, and high-specification fashion items such as spectacle frames; and production of similar but individual components manufactured in relatively large numbers such as, for example, hearing aid components. Examples of industrial sectors that may benefit from articles of the invention include the aerospace industry, medical technology, mechanical engineering, automobile construction, the sports industry, the household goods industry, the electrical industry, the packaging industry, and lifestyle products.

Preferred laser-sinterable powder compositions of the invention are capable of forming SLS articles having excellent mechanical properties.

SLS test specimens formed from powder compositions of the invention (including, e.g., non-filled powder compositions) preferably exhibit an elongation at break of at least about 3%, more preferably at least about 5%, and even more preferably at least about 10%, when tested using the elongation at break test method of the below Test Methods section.

SLS test specimens formed from powder compositions of the invention (including, e.g., non-filled powder compositions) preferably exhibit a tensile strength at break of at least about 30 MPa, more preferably at least about 40 MPa, and even more preferably at least about 50 MPa, when tested using the tensile strength at break test method of the below Test Methods section.

SLS test specimens formed from powder compositions of the invention (including, e.g., non-filled powder compositions) preferably exhibit a tensile modulus of at least about 1,000 MPa, more preferably at least about 1,500 MPa, and even more preferably at least about 1,800 MPa, when tested using the tensile modulus test method of the below Test Methods section.

Test Methods

Unless indicated otherwise, the following test methods were utilized in the Examples that follow. The elongation at break, tensile strength at break, and tensile modulus testing was performed using International Standard Organization (ISO) 3167 Type 1A 150 mm long multipurpose dog-bone test specimens having a center section that was 80 mm long by 4 mm thick by 10 mm wide and having sintered layers oriented in a flatwise planar direction relative to the flatwise face of the test specimens. The average thickness of the powder layers used to generate the test specimens is that recommended by the manufacturer. In the absence of manufacturer recommendations, the average thickness of the powder layer can be optimized to yield optimal mechanical properties.

A. Elongation at Break

Elongation at break testing was performed according to ISO 527 using a constant pull rate of 50 millimeters per second (mm/sec).

B. Tensile Strength at Break

Tensile strength at break testing was performed according to ISO 527 using a constant pull rate of 50 mm/sec.

C. Tensile Modulus

Tensile modulus testing was performed according to ISO 527 using a constant pull rate of 50 mm/sec.

D. Melt Flow Index

Melt flow index was determined using a Dynisco D4004 apparatus that meets DIN 1133 and ASTM D1238 standards. The measurements were conducted at a temperature of 190° C. with 240 seconds of preheating and a 5 kilogram weight.

E. Recyclability Test

Figure 2:
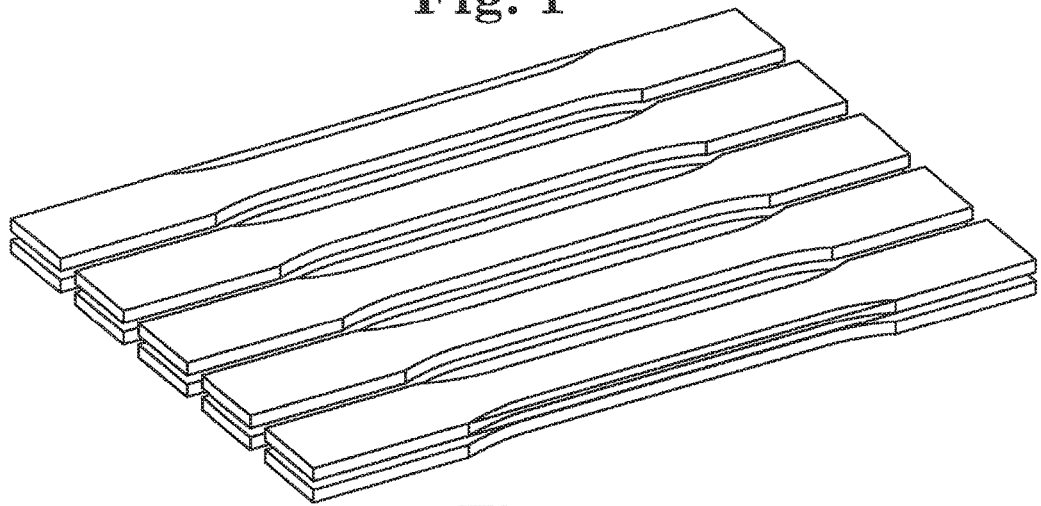
FIG. 2 is a representation of the dog-bone SLS test specimens produced in the Recycling test of the Test Methods.
Figure 3A:
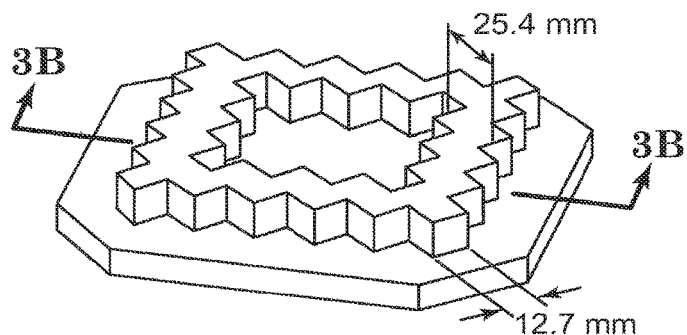
FIG. 3A is a top perspective view of the "pyramid" SLS article produced in the Recycling test of the Test Methods.
Figure 3B:
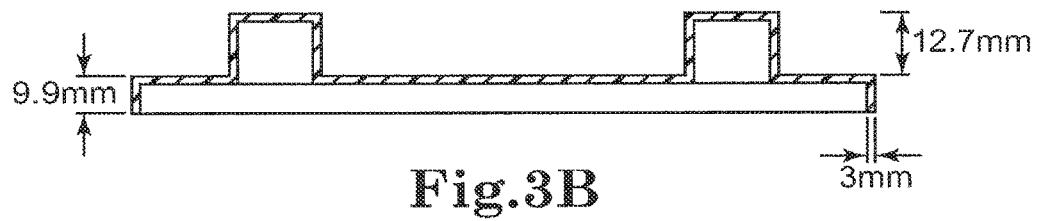
FIG. 3B is a sectional view of the pyramid of FIG. 3A taken along line 3B-3B.
Figure 4:
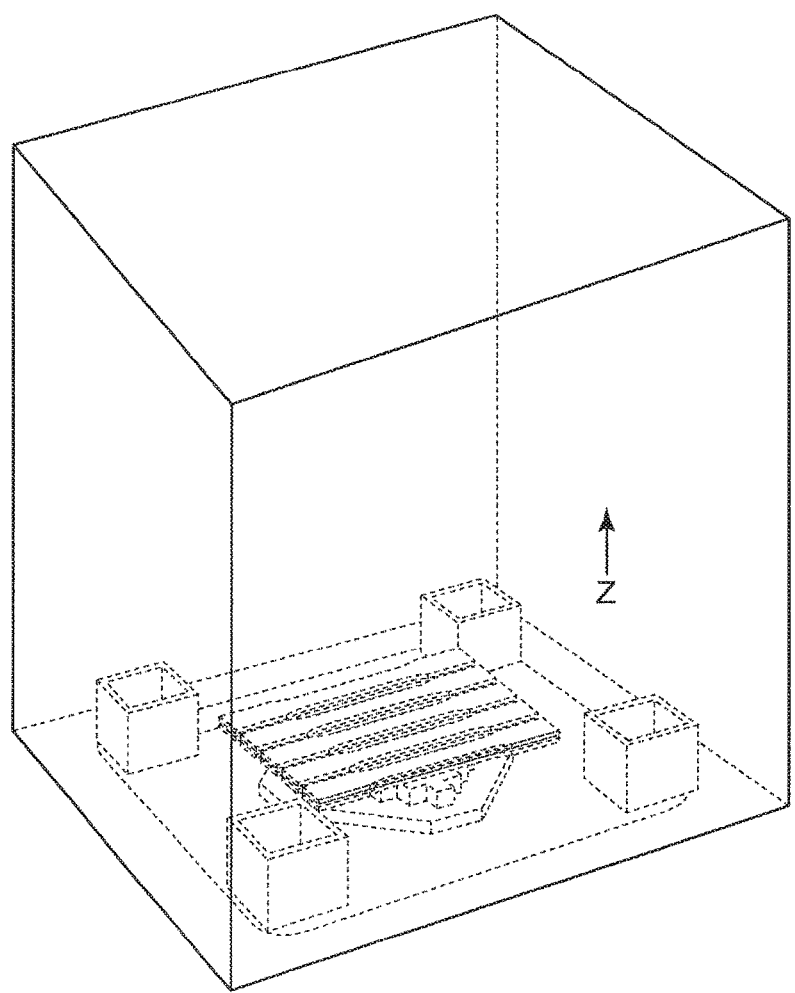
FIG. 4 is a representation of the orientation of the SLS articles of FIGS. 1-3 in the powder bed of the SLS machine pursuant to the Recycling test of the Test Methods.

The recyclability of powder in SLS processes was determined as follows using a VANGUARD HS HiQ SLS system. The SLS machine was loaded with 20 kilograms of powder in the feed beds. From the powder, the following sintered parts were produced: (i) four towers as shown in FIG. 1 having a height of 51.76 millimeters (mm), a square base measuring 51.31 mm on each side and a wall-thickness of 5.0 mm; (ii) ten D638 I, Type I dog-bone test specimens as shown in FIG. 2 arranged in two flat-wise layers (spaced from each other by a 3.28 mm thickness of powder) of five specimens; and (iii) a "pyramid" as shown in FIGS. 3A and 3B having the dimensions (in mm) indicated therein. The orientation of the sintered parts in the part bed is illustrated in FIG. 4, with the sintered layers perpendicular to the Z-direction and all of the sintered layers formed entirely from the powder layers corresponding to the height of the towers.

The sintered articles were produced using layer thicknesses of about 0.1 mm, a laser power setting of about 40 Watts, and a laser scan spacing of 0.2 mm. The temperature of the powder feed beds were about 135-140° C. and the temperature of the part bed was about 170-175° C. To produce the parts in a given SLS cycle, the powder was subjected to the above elevated temperatures for at least about 8 hours in the SLS machine. Once the powder had cooled after each run, (i) the sintered parts were removed from the residual powder and (ii) all of the residual powder was removed from the SLS machine and mixed and sieved to yield a homogenous powder blend. For the below Examples, each part-forming run consumed approximately 0.3 kilograms of powder in forming the SLS parts (for other powders the mass of powder consumed per run will vary depending upon the particular density of the powder being tested). 200 grams of the residual powder was sampled to determine the melt flow index, melting point, recrystallization point, and melt enthalpy testing. The remaining residual powder (i.e., the recycled powder) was placed back in the SLS machine and each subsequent run was repeated using the above procedure. At no time was the recycled powder replenished with fresh powder. Mechanical testing was performed using the ASTM D638 I, Type I dog-bone test specimens of FIG. 2.

For polymer powders other than those of the below Examples, the parameters of the SLS machine may need to be suitably adjusted depending, for example, upon the melting and recrystallization points of the particular polymer powder. In general, the part bed temperature will typically be at least about 2-3° C. below the melting point of the polymer powder and the feed bed temperature will typically be at least about 30° C. below the melting point of the polymer powder.

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight.

Example 1: Preparation of Polyamide Component

A reaction mixture was prepared that included 0.8 wt-% trimesic acid, 4.0 wt-% water, 0.1 wt-% of the IRGANOX 1098 stabilizer product (N,N'-hexane-1,6,-diylbis[3-(3,5-di-tert-butyl-4-hyroxphenyl)propioneamide, CAS 23128-74-7), and 0.15 wt-% of the SANDOSTAB P-EPQ stabilizer product (aryl phosponite, CAS 119345-01-6), with the balance of the reaction mixture being laurolactam. In a polymerization vessel, the reaction mixture was subjected to a suitable pressure phase (20 bar and a temperature of 300° C.) for at least 4 hours for ring opening. The reaction mixture was then subjected to a suitable expansion phase (280° C. for 1.5 hours), followed by a suitable condensation phase (260° C. for 4 hours to reach a desired viscosity). The resulting polymer material was then pelletized. The resulting pellets were dried until a water content of less than 0.5 wt-% was achieved.

The polyamide material of Example 1 exhibited the properties included in Table 1 below.

TABLE 1

| Property | Measured Value | Remarks |
|---|---|---|
| Relative Viscosity | 1.62 | Measured in m-cresol; 0.5 g polymer per 100 ml m-cresol |
| Melt Viscosity | 350 Pa · s | Measured at 210° C. and a 2.16 kilogram load with a Goettfert viscometer (MVR). |
| Melting Point | 178° C. | *Measured by Differential Scanning Calorimetry (DSC) |

TABLE 1-continued

| Property | Measured Value | Remarks |
|---|---|---|
| Recrystallization Point | 145° C. | *Measured by DSC |
| Melt enthalpy | 62 J/g | *Measured by DSC |
| Carboxylic end group concentration | 90 µeq/g | |
| Amine end group concentration | 15 µeq/g | |
| Number Average Molecular Weight ($M_n$) | 19,000 g/mol | Measured by gel permeation chromatography (GPC) |
| Weight Average Molecular Weight ($M_w$) | 38,500 g/mol | Measured by GPC |
| Concentration of Volatiles | ~0.7 wt-% | Measured by Thermogravimetric Analysis (TGA) (170° C. for 2 hours) |

*The DSC measurements were made using a heating and cooling rate of 10 K/min.
Abbreviations: Pascal-second ("Pa · s"); Joules/gram ("J/g"); micro equivalents of end group per gram of material ("µeq/g"); grams per mole ("g/mol").

Example 2: Preparation of Laser-Sinterable Powder Composition

To produce a powder suitable for SLS applications, the pellets of Example 1 were cryogenically milled at a temperature of about −78° C. to produce a laser-sinterable powder. The laser-sinterable powder exhibited a particle size distribution of between 0 and about 100 microns with a volume-average particle diameter of about 55 microns. To improve the flow properties of the powder, the powder was blended with 0.1 wt-% of fumed amorphous silica powder to form a homogenous blend.

Example 3: Production of SLS Articles

To assess the suitability of the powder of Example 2 for producing SLS articles, the powder was applied to a build surface of a VANGUARD HS HiQ SLS system (from 3D Systems of Rock Hill, S.C., USA) and used to construct SLS articles. The SLS articles were produced using layer thicknesses of about 0.1 millimeters (mm), a laser power setting of between about 10 and 70 Watts, a laser scan spacing of between 0.1 mm and 0.3 mm, and a part bed temperature of about 170-175° C. No fuming was observed in the build chamber of the SLS system, indicating that the powder did not contain unsuitable amounts of residual low-molecular-weight compounds (which was consistent with the low level of volatiles shown in Table 1). The resulting SLS articles exhibited good coloration and resolution and did not exhibit any noticeable curl, thereby indicating that the powder of Example 2 was suitable for use in forming SLS articles.

To assess the mechanical properties of SLS articles of the invention, test specimens were produced from the powders of Example 2 using the VANGUARD HS HiQ SLS system in accordance with the parameters described above. The test specimens exhibited a tensile strength at break of about 35-55 MPa, an elongation at break of about 8-15%, and a tensile modulus of about 1300-1850 MPa. All of these mechanical properties were considered acceptable.

Example 4: Mechanical Properties of Test Specimens Formed from Recycled Powder

The recyclability of the laser-sinterable powder composition of Example 2 was demonstrated as follows. Prior to the first run, the melt flow index, melting point, recrystallization point, and melt enthalpy was determined for fresh powder composition of Example 2. This data is shown in Table 2 below as "run 0". The powder composition of Example 2 was subjected to 10 runs in the SLS machine using the above Recycling Test Method.

As illustrated by the data of Table 2, the powder composition of Example 2 exhibited good recyclability. The melting point and recrystallization points of the recycled powder remained essentially constant over the 10 runs. In addition, even after being subjected to 10 runs in an SLS machine without replenishment with fresh powder, the SLS articles formed from the recycled powder did not exhibit any undesirable amount of orange peel.

The data in Table 2 suggests a markedly increased level of recyclability relative to certain conventional laser-sinterable polyamide powders. For example, such conventional powder, when tested using a similar recycling methodology, exhibited orange peel after 4-5 runs and a melt flow index that after 6 runs had decreased by 80% relative to the fresh powder (whereas the melt flow index of the recycled powder of Example 2 had decreased by only about 30% after 6 runs). Since the melt flow index of a material is inversely related to its viscosity, the melt flow index data indicates that recycled powder of Example 2 exhibited substantially reduced viscosity increases relative to recycled conventional laser-sinterable polyamide powders.

TABLE 2

| | Powder | | | | Articles | |
|---|---|---|---|---|---|---|
| Run | Melt Flow Index (g/10 min) | Melting Point (° C.) | Recrystallization Point (° C.) | Melting Enthalpy (J/g) | Curl (Yes/No) | Orange Peel (Yes/No) |
| 0 | 40.54 | 177.41 | 151.54 | 61.87 | — | — |
| 1 | 38.93 | 177.11 | 152.01 | 62.78 | No | No |
| 2 | 33.36 | 177.29 | 151.90 | 62.06 | No | No |
| 3 | 31.89 | 177.48 | 152.04 | 62.78 | No | No |
| 4 | 30.85 | 177.26 | 151.93 | 62.75 | No | No |
| 5 | 29.76 | 177.44 | 151.75 | 64.25 | No | No |
| 6 | 28.13 | 177.40 | 151.95 | 65.20 | No | No |
| 7 | 26.04 | 177.10 | 151.92 | 64.97 | No | No |
| 8 | 25.33 | 177.12 | 152.05 | 70.61 | No | No |
| 9 | 24.38 | 177.23 | 151.78 | 69.59 | No | No |
| 10 | 23.95 | 177.27 | 151.75 | 69.28 | No | No |

As shown in Table 2, the ground powder of Example 2 exhibited both (i) a relatively low difference between the melting point and the recrystallization point and (ii) a relatively low melt enthalpy. The laser-sintering art includes teachings (see, e.g., U.S. Pat. No. 6,245,281) that both a substantially larger sintering window (i.e., the difference between the melting point and the recrystallization point) and a substantially larger melt enthalpy are needed for a powder to perform suitably in SLS applications. Nonetheless, the ground powder of Example 2 exhibited excellent SLS performance.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A powder composition, comprising:
   a laser-sinterable powder including at least 20 weight percent of a polyamide polymer component;
   wherein the polyamide polymer component includes one or more branched polyamide polymers in an amount that comprises at least 5 weight percent of the laser-sinterable powder, wherein the branched polyamide comprises a star polymer having a single branching unit and at least 3 oligomer or polymer arms covalently attached to the branching unit, wherein the powder composition has a melt enthalpy of less than 100 j/g and a sintering window of less than 40° C.

2. The powder composition of claim 1, wherein the single branching unit is attached to at least three branch units via amide linkages.

3. The powder composition of claim 1, wherein the single branching unit is formed from a polycarboxylic acid.

4. The powder composition of claim 3, wherein the polycarboxylic acid is chosen from benzene-pentacarboxylic acid; mellitic acid; 1,3,5,7-naphthalene-tetracarboxylic acid; 2,4,6-pyridine-tricarboxylic acid; pyromellitic acid; trimellitic acid; trimesic acid; 3,5,3',5'-biphenyltetracarboxylic acid; 3,5,3',5'-bipyridyltetracarboxylic acid; 3,5,3',5'-benzophenonetetracarboxylic acid; 1,3,6,8-acridinetetracarboxylic acid; 1,2,4,5-benzenetetracarboxylic acid; anhydrides, amides, or esters thereof; or a mixture thereof.

5. The powder composition of claim 1, wherein the single branching unit is formed from a polyamine.

6. The powder composition of claim 5, wherein the polyamine is chosen from diethylenetriamine; triethylenetetramine; tris-(2-aminoethyl)amine; bis(hexamethylene)triamine; bis(6-aminohexyl)amine; 1,2,3-triaminopropane; 1,2,3,4-tetraaminobutane; melamine; a poly(propyleneoxide)amine based on trimethylolpropane or glycerin; a tallow triamine; or a mixture thereof.

7. The powder composition of claim 1, wherein the single branching unit is formed from a polyamide.

8. The powder composition of claim 1, wherein at least one of the oligomer or polymer arms comprises a reaction product of reactants including a C2-C20 amino acid, a C4-C20 lactam, or a mixture thereof.

9. The powder composition of claim 1, wherein the branched polyamide includes a nylon-11 branch unit, a nylon-12 branch unit, or a combination thereof.

10. The powder composition of claim 1, wherein the branched polyamide includes polyamide branch units formed from laurolactam, aminoundecanoic acid, or a mixture thereof.

11. The powder composition of claim 1, wherein the branched polyamide includes polyamide branch units formed from a reaction product of reactants including aliphatic, cycloaliphatic, or aromatic C2-C36 diacids or C2-C36 diamines.

12. The powder composition of claim 1, wherein the branched polyamide is a reaction product of one or more AB compound and one or more Bn compound, wherein:
   A and B are functional groups capable of reacting with one another;
   n denotes the number of B functional groups present in the Bn compound, and wherein n is 3 or more; and
   the stoichiometry of the mole equivalents of Bn compound to mole equivalents of AB compound ranges from 0.0001:1 to 0.03:1.

13. The powder composition of claim 1, wherein the branched polyamide comprises amine end groups.

14. The powder composition of claim 1, wherein the branched polyamide comprises carboxylic acid end groups.

15. The powder composition of claim 1, wherein the laser-sinterable powder comprises a ground powder.

16. The powder composition of claim 15, wherein a test specimen exhibits an elongation at break of at least 3% when the powder composition is laser-sintered to form the test specimen.

17. The powder composition of claim 1, wherein the powder composition has a melt enthalpy of 60 J/g to 70 J/g and wherein a volume-average particle diameter of the powder composition is between 5 and 100 microns.

18. A method, comprising:
providing a layer of the laser-sinterable powder of claim 1;
selectively melting at least a portion of the layer; and
forming a three-dimensional article by applying one or more additional layers to a preceding layer of the laser-sinterable powder.

19. The method of claim 18, further comprising:
using residual powder composition from forming the three-dimensional article in a selective sintering process to produce a second three-dimensional article that does not exhibit orange peel.

20. A three-dimensional article comprising:
a plurality of sintered layers including a polymer matrix;
wherein the branched polyamide polymer of claim 1 forms at least 5 weight percent of the polymer matrix.

* * * * *